United States Patent [19]

Risler et al.

[11] Patent Number: 4,946,693
[45] Date of Patent: Aug. 7, 1990

[54] PROCESS FOR THE PREPARATION OF INTERMEDIATE MOISTURE VEGETABLES

[75] Inventors: Pierre Risler, Montmorency; Jean-Francois Tence, Clamart, both of France

[73] Assignee: Nestec S.A., Vevey, Switzerland

[21] Appl. No.: 223,662

[22] Filed: Jul. 21, 1988

Related U.S. Application Data

[60] Continuation of Ser. No. 806,122, Dec. 6, 1985, abandoned, which is a division of Ser. No. 468,980, Feb. 23, 1983, abandoned.

[30] Foreign Application Priority Data

Mar. 3, 1982 [FR] France ................. 82 03513

[51] Int. Cl.$^5$ ................. A23B 7/022; A23B 7/06; A23B 7/14
[52] U.S. Cl. ................. 426/243; 426/241; 426/242; 426/321; 426/335; 426/589; 426/640
[58] Field of Search ............... 426/589, 639, 640, 241, 426/242, 243, 321, 335

[56] References Cited

U.S. PATENT DOCUMENTS

| | | | |
|---|---|---|---|
| 2,468,744 | 5/1949 | Galvin | 426/589 |
| 3,202,514 | 8/1965 | Burgess | 426/805 |
| 3,281,251 | 10/1966 | Templeton | 426/634 |
| 3,482,985 | 12/1969 | Burgess | 426/805 |
| 3,563,768 | 2/1971 | Melnick | 426/589 |
| 3,595,681 | 7/1971 | Kaplow | 426/321 |
| 3,694,233 | 9/1972 | Kaplow | 426/589 |
| 3,732,112 | 5/1973 | Frankenfeld et al. | 426/639 |
| 3,736,148 | 5/1973 | Katz | 426/321 |
| 3,752,677 | 8/1973 | Andrews et al. | 426/589 |
| 3,769,042 | 10/1973 | Kaplow | 426/589 |
| 3,950,560 | 4/1976 | Rahman et al. | 426/468 |
| 4,096,283 | 6/1978 | Rahman | 426/640 |
| 4,140,809 | 2/1979 | Glasser et al. | 426/589 |
| 4,156,020 | 5/1979 | Bohrmann et al. | 426/589 |
| 4,183,963 | 1/1980 | Brimelow et al. | 426/639 |
| 4,291,066 | 9/1981 | Anema et al. | 426/589 |
| 4,341,803 | 7/1982 | Koshida | 426/640 |
| 4,361,589 | 11/1982 | Wavters et al. | 426/640 |
| 4,447,460 | 5/1984 | Lewis et al. | 426/640 |
| 4,510,163 | 4/1985 | Hansen | 426/241 |

FOREIGN PATENT DOCUMENTS

| | | | |
|---|---|---|---|
| 2906839 | 9/1979 | Fed. Rep. of Germany | 426/589 |
| 1004522 | 9/1965 | United Kingdom | 426/640 |
| 1254562 | 11/1971 | United Kingdom | 426/589 |
| 2016900 | 10/1979 | United Kingdom | 426/589 |
| 2042855 | 9/1980 | United Kingdom | 426/241 |

OTHER PUBLICATIONS

Freeze Drying & Advanced Food Technology Goldblith et al Academic Press 1975.
Water Activity and Food Troller et al Academic Press 1978.
Food Technology 8/70 vol. 24, pp. 889+, Kaplow.
Food Technology 8/70 vol. 24, pp. 896+, Brockman.
Elements of Food Technology pp. 23 plus, Desrosier 1977, AVI Publ.
Microwave Heating, Copson, AVI Publ. 1962, pp. 387, 388, 325.
Food Engineering, 7/65, pp. 54, 55.
Food Engineering 5/66 pp. 52 plus.
Food Engineering 11/64, pp. 49 plus.

*Primary Examiner*—Steven Weinstein
*Attorney, Agent, or Firm*—Vogt & O'Donnell

[57] ABSTRACT

To prepare instant food products having a long storage life, such as soups or sauces incorporating a garnishing, including vegetables having intermediate moisture content which are stabilized microbiologically and organoleptically without the aid of humectants such as polyols and sugars and which, when prepared in the soups or sauces, resemble freshly prepared products, the vegetables are blanched or cooked, partially dehydrated and dry mixed with salt. Glutamate and anti-mycotic agents may be added and the vegetables may be compacted to further enhance their stability.

16 Claims, No Drawings

PROCESS FOR THE PREPARATION OF INTERMEDIATE MOISTURE VEGETABLES

CROSS REFERENCE TO RELATED APPLICATIONS

This is a continuation application of application Ser. No. 06/806,122, filed on Dec. 6, 1985, now abandoned, which is a divisional application of application Ser. No. 06/468,980, filed on Feb. 23, 1983, now abandoned.

This invention relates to a food product having a long storage life, notably an instant soup or instant sauce, comprising a dehydrated mass and a garnishing consisting of pieces of food, the mass and the garnishing being packaged separately.

These products, including garnishing including vegetables, are conventionally sterilized or dehydrated. Sterilization requires a long time and a great deal of energy, imposes the need for an expensive package and results in an organoleptic deterioration. Dehydration, for example, in hot air or on a cylinder, is accompanied by a surface hardening of the pieces of garnishing, and vegetables, in particular, lose their instantly soluble character and assume the taste of hay. Lyophilization procures an instant character, but is very onerous and does not always allow the desired qualities to be maintained (for example, carrots rapidly become discoloured, even when protected from oxygen).

U.S. Pat. No. 3,563,768 proposes instant soups in a double sachet, one of the compartments containing the powder binder, fats, flavourings and trisodium phosphate, while the other compartment contains the non-powder product in pieces (i.e., pasta, vegetables, meat). The pieces are cooked by infusion in an aqueous medium containing acids, sequestering agents and fungicides so that they are organoleptically and microbiologically stable, then drained and the sachets are filled while hot. The trisodium phosphate is used to neutralise the acid during dissolution. This presentation has the disadvantage of using foreign agents which affect the taste. Moreover, the garnishing, which is completely hydrated, occupies a relatively large volume.

According to another technique which is described in British Patent No. 2,016,900, the binder and the garnishing are mixed in a semi-moist condition, the soup being presented in a concentrated form. In this case, the microbiological stability requires the presence of a relatively large quantity of humectant, notably sugar, which makes it impossible to obtain a product resembling a freshly prepared savoury soup. Moreover, the pasty consistency of the soup makes it difficult to pack and means that it is troublesome to use when it is being prepared at home.

The present invention provides, in particular, an instant soup or sauce which has a long storage life, does not have a foreign taste, is easy to use and which, when reconstituted, is distinguished by superior organoleptic qualities making it closely resemble a freshly prepared product.

The product according to this invention is characterised in that the pieces of food have a water activity of from 0.75 to 0.80, a pH of from 4.5 to 7 and they are stabilized organoleptically and microbiologically without the addition of humectants such as polyols and sugars.

The terms "instant" and "rendered instant" as used herein refer to products which are soluble, dispersible or rehydratable in an aqueous medium, from tepid to boiling, within an interval of a few seconds to about 3 minutes. The expression "having a long storage life" designates preserved or appertized foods, the life of which is from 5 to 15 months.

The water activity (Aw) is designated as the quotient of the vapour pressure of a product over the vapour pressure of pure water under the same conditions. The coefficient of the water activity is indicative of bound water. A low level thereof corresponds to a reduction in the water which is available for the growth of microorganisms, and the product is stabilized microbiologically. This stabilization implies the use of humectants binding water molecules, the humectants which are conventionally used in so-called "semi-moist" products being polyols, notably glycerol and sugars, in particular sucrose.

The product comprises two components which are packaged in separate compartments. One of the components is the dehydrated mass particulate. This is a dry mixture (from 2 to 5% by weight of moisture) in powder form, in the form of flakes, grains or a combination of these particles, depending on the nature of the desired reconstituted sauce or soup.

A base for a clear soup or consommé will comprise, for example, fats of animal origin, such as premier beef jus or chicken fat, protein hydrolyzates, yeast autolyzates, vegetable or meat extracts, maltodextrins, spices, flavourings, salt and glutamate powder. It is possible to add flakes of vegetables obtained by drum drying and flakes of a gelatinized mixture of pureé of vegetables and starch.

In a soup of a pulpy appearance, the dehydrated base will advantageously comprise vegetable particles, potato flakes and, in powder form, milk and derivatives thereof, fats such as premier beef jus, chicken fat or butter oil.

Finally, a thick cream soup or a sauce will generally contain an instant binder obtained, for example, by the gelatinization of a soup of flour, maltodextrin and skimmed milk, by drum drying and flaking of butter oil, egg yolks, yeast extract, spices and salt. In every case, the dehydrated mass corresponds to from 25 to 150 g and preferably to from 25 to 100 g/l of reconstituted soup or sauce.

The dehydrated mass of a clear soup or a thick cream soup may also contain pasta, semolina and cereals which are rendered instant.

The other component of the product according to the present invention is a garnish which includes pieces of food, such as pasta, meat, mushrooms and, more especially, vegetables. These may include leaf vegetables, for example, leeks and asparagus, or root or tuber vegetables, such as carrots, turnips, celeriac, or bulb vegetables, such as onions presently used in the production of soups, thick cream soups or sauces. They represent from 10 to 50 g/l in the reconstituted soup or sauce.

As indicated above, they are stabilized microbiologically without the use of conventional humectants, i.e., without addition of polyols and sugars; the water activity is reduced while increasing the concentration of the natural soluble constituents of the vegetable cell and while adding to the vegetable, thus "conserved", humectants which enter into the formulation of powder masses, i.e., salt, vegetable extracts and sodium glutamate. The additives, salt and glutamate will advantageously correspond to from 8 to 12 g/l in a reconstituted soup, the glutamate representing from 0 to 2 g/l.

The water activity of from 0.75 to 0.80 allows the bacteriological stabilization of the product, and only moulds and yeast are still able to develop. To prevent a development of this type, an anti-mycotic agent of food quality will advantageously be added to the product, such as sorbic acid or potassium sorbate, preferably in a concentration of about 1% by weight. In a variant, the product will be pasteurized in its package at about 90° C. for about 3 minutes.

On the other hand, the garnishing is stabilised organoleptically. This means, within the present context, that the texture of the vegetables approaches that of freshly cooked vegetables. It also means that the quantity of salt and of glutamate corresponds to the quantities which are compatible with the desired flavour in a reconstituted soup, the salt constituting about 12% by weight of the garnishing while the quantity of glutamate is minimal.

The present invention also relates to a process for the preparation of the pieces of food, notably intermediate moisture vegetables of the garnishing. This process is characterised in that the pieces are washed and prepared and then blanched or cooked, while retaining at least 85% by weight of the intracellular soluble substances, the soluble constituents of the vegetable cell which may function as humectants, the blanched or cooked pieces are partly dried and are mixed with salt and possibly with sodium glutamate or with extracts so that their moisture content ranges from 40 to 50% by weight.

To carry out the present process, the vegetables, leaf vegetables as well as root vegetables, are washed and prepared and then cut into small cubes or into pieces of a side length of from 3 to 10 mm.

According to a first preferred embodiment, the vegetables are then blanched or cooked by the application of microwaves. This method is preferably carried out continuously in a belt cooker with an output per hour of cut and prepared material of from 200 to 500 kg, depending on the microwave power which is applied of from 25 to 50 kW in the preferred frequency band of 915±25 MHz, the thickness of the layer of vegetables being less than or equal to 10 cm and the duration of the treatment under atmospheric pressure being about 20 minutes.

In a variant, within the frequency band of 2450±50 MHz, the vegetables will be in a layer which is less than or equal to 3 cm and an output per hour of 60 kg, for example, will be obtained with an applied power of 12 kW under atmospheric pressure, the treatment lasting for about 9 or 10 minutes.

According to another variant which may be applied in particular to leaf vegetables, the microwave treatment may be carried out under a reduced pressure of, for example, from 550 to 650 mm of mercury in a cooker provided with a sieve at a temperature of from about 91° to 96° C. compatible with the cooking.

As far as possible, it is desirable to maintain in the vegetables all of the soluble substances which may thus function as humectants. This is why the use of microwaves is particularly advantageous, since it does not cause a loss or denaturation of the soluble substances and provides, within the conditions of the treatment under atmospheric pressure, an evaporation of about 15% by weight of the constitution water.

According to another embodiment of the present process, the vegetables are blanched or steamed, for example, in an endless belt blanching machine. This treatment is usually accompanied by a loss of from 10 to 15% by weight of solubles, whereas the evaporation by microwaves only corresponds to about 4 to 5% by weight.

The blanched or cooked vegetables are then partially dried, preferably in a continuous hot air drier, by entrainment, the air temperature ranging from 60° to 120° C. over a period of from 45 to 120 minutes, depending on the nature of the vegetables.

For a given value of the Aw coefficient, and bearing in mind the quantities of salt and glutamate which are compatible with the desired flavour of the reconstituted product, the desired degree of drying is determined and the treatment parameters (output, temperature, air circulation) are advantageously subjected to a continuous measurement of the downstream humidity. The fact will be taken into consideration that the drying of the vegetables is to correspond at the most to 75% of removed water with respect to the weight of the cooked or blanched vegetable, in order to avoid a hardening of the vegetables. At the outlet of the drier, the vegetables preferably contain from 45 to 55% by weight of moisture.

A predetermined quantity of salt and possibly of glutamate is then added to the vegetables, preferably by dry mixing, which makes it possible to exactly adjust the quantity of humectant which infuses into the vegetable. In a variant, the vegetables may be dried in a more enforced manner, and it would be possible to introduce the salts in the form of brine. The total quantity of salt plus glutamate to be mixed with the vegetable will of course depend on the content of dry matter in the vegetable which is used and on the nature of the cooking or blanching operation. If the vegetables are steamed, the loss of some of the solubles has to be compensated for by a complement, generally in the form of glutamate which is added when the maximum desired quantity of salt has been attained. On the other hand, the addition of glutamate is not always necessary in the case of cooking or blanching by microwaves, and this constitutes a major advantage. Finally, the anti-mycotic agent is preferably added.

After these additions, the vegetables are preferably compacted so that they occupy a small volume, without impairment to their texture, under pressures of from 3 to 5 kg/cm$^2$. This has the advantage of facilitating the proportioning and the filling of the vegetables into their compartment. Moreover, the compacted vegetables are less accessible to mould, yeast and oxygen.

As mentioned above, the two components will be packaged into any packaging which suits their nature, comprising two separate compartments, for example, flexible sachets, thermoformed containers or containers which are covered with a lid, etc., provided that the materials which form the compartments are tight with respect to moisture, light and oxygen. For example, a package as described in French patent application No. 82 03513 may be used. Moreover, the two components will advantageously be packaged under an inert atmosphere and protected from light.

The following Examples illustrate the process for the preparation of the vegetable garnishing and the food products having two components. The parts and percentages are based on the weight, unless otherwise indicated.

EXAMPLES 1 TO 16

Carrots are peeled, prepared, washed and sieved, or leeks are prepared and washed in order to obtain pieces having a side length of from 3 to 10 mm.

The washed and prepared vegetables are treated in a microwave oven having an endless belt, under atmospheric pressure for 20 minutes in a 9 cm layer. The power which is applied is 50 kW at 915 MHz, and the output of the vegetables is 400 kg/h.

For comparison purposes, a parallel treatment is carried out using steam in an endless belt blanching machine under atmospheric pressure for 15 minutes, the steam flow rate being 0.48 tonne/h.

In every case, the blanched or cooked vegetables are dried in a continuous air drier for 60 minutes in the case of carrots and 75 minutes for leeks at the graduated air temperature of from 120° to 60° C.

The quantity of salt and possibly of glutamate required for attaining the previously selected Aw value is then mixed dry, while adding potassium sorbate in a proportion of 1% by weight.

The following Tables I and II provide the yields-composition of the finished vegetables which are stabilized microbiologically and which have a good organoleptic quality.

EXAMPLES 17–20

In these Examples, the "vegetables on support" are prepared by drum drying and flaking a vegetable pureé mixed with starch (Examples 17–20), the "instant binder" is prepared by drum drying and flaking a soup of flour, maltodextrin and skimmed milk (Example 19), while the "expanded mass" is obtained by the extrusion under pressure of the mass which is rendered thermoplastic and is expanded at the outlet of the extrusion head in an enclosure under vacuum (Example 20).

The vegetable garnishing is prepared as indicated in Examples 1, 3, 5, 7, 9, 11, 13 or 15. The vegetables are compacted in a forming machine under a pressure corresponding to 4 kg/cm$^2$ at the level of the vegetables. The compacted garnishing mass is then packaged into one of the compartments of a thermoformed multiple package which is sealed with a lid, while the dehydrated mass is metered into a second compartment which is sealed with a lid.

In a variant, it would be possible not to shape the garnishing and to package the products in flexible sachets comprising two compartments, the openings of which are opposite, and the filling being effected, for example head to tail.

The products which are obtained have the composition indicated in the following.

TABLE I carrots

| DM % | Cooking method | Weight after drying kg | Composition of finished product | | | | | Weight kg | (*) Production yield % |
|---|---|---|---|---|---|---|---|---|---|
| | | | veg % | H$_2$O % | NaCl % | Glu % | aw | | |
| 10.0 | M W | 90.52 | 38.87 | 49.13 | 12.00 | 0.00 | 0.80 | 102.85 | 17.98 (1) |
| 10.0 | S | 94.46 | 28.65 | 48.79 | 12.00 | 10.56 | 0.80 | 121.98 | 21.32 (2) |
| 14.0 | M W | 126.78 | 38.87 | 49.13 | 12.00 | 0.00 | 0.80 | 144.07 | 25.19 (3) |
| 14.0 | S | 107.11 | 40.19 | 47.81 | 12.00 | 0.00 | 0.80 | 121.72 | 21.28 (4) |
| 10.0 | M W | 85.00 | 37.84 | 42.60 | 12.00 | 7.56 | 0.75 | 105.67 | 18.47 (5) |
| 10.0 | S | 94.46 | 26.57 | 45.23 | 12.00 | 16.20 | 0.75 | 131.56 | 23.00 (6) |
| 14.0 | M W | 108.00 | 45.63 | 42.37 | 12.00 | 0.00 | 0.75 | 122.73 | 21.46 (7) |
| 14.0 | S | 93.93 | 44.58 | 41.02 | 12.00 | 2.40 | 0.75 | 109.73 | 19.18 (8) |

TABLE II leeks

| DM | Cooking method | Weight after drying kg | Composition of finished product | | | | | Weight kg | (*) Production yield % |
|---|---|---|---|---|---|---|---|---|---|
| | | | veg % | H$_2$O % | NaCl % | Glu % | aw | | |
| 10.0 | M W | 93.80 | 37.68 | 50.32 | 12.00 | 0.00 | 0.80 | 106.59 | 18.63 (9) |
| 10.0 | S | 89.00 | 32.13 | 49.51 | 12.00 | 6.36 | 0.80 | 109.02 | 19.06 (10) |
| 14.0 | M W | 130.77 | 37.68 | 50.32 | 12.00 | 0.00 | 0.80 | 148.60 | 25.98 (11) |
| 14.0 | S | 112.34 | 38.41 | 49.60 | 12.00 | 0.00 | 0.80 | 127.66 | 22.32 (12) |
| 10.0 | M W | 85.00 | 38.69 | 43.55 | 12.00 | 5.75 | 0.75 | 103.36 | 10.07 (13) |
| 10.0 | S | 89.00 | 29.39 | 45.29 | 12.00 | 13.32 | 0.75 | 119.18 | 20.83 (14) |
| 14.0 | M W | 112.76 | 43.70 | 44.30 | 12.00 | 0.00 | 0.75 | 128.14 | 22.40 (15) |
| 14.0 | S | 93.97 | 45.92 | 42.08 | 12.00 | 0.00 | 0.75 | 106.78 | 18.67 (16) |

Key
DM: weight percentage of dry matter of the starting vegetable; M W: microwaves;
S: steam; veg.: vegetable; Glu: sodium glutamate
*For a given starting dry matter, either 10 or 14%, the production yields are only comparable if the finished products do not contain glutamate and if their aw is identical.
Ex.: (1) and (3); (1) and (4); (3) and (4); (9) and (11); (9) and (12); (11) and (12); (15) and (16) are comparable. (5) (6) (7) and (8) are not comparable.

It may be seen quite clearly that the treatment using microwaves necessitates a smaller quantity of glutamate to attain the desired Aw, compared to the treatment using steam and, in some cases, makes it possible to avoid this addition. On the other hand, the yields are always better.

Pulpy soup containing carrots, celeriac, turnips and leeks (Example 17)

| | Composition (%) |
|---|---|
| Garnishing of compressed carrots, leeks, celeriac and turnips | 37.3 |

-continued

| | Composition (%) |
|---|---|
| Dehydrated mass | |
| Vegetables on support (flakes) | 48.5 |
| Skimmed milk  (powder) | 6.3 |
| Fats (powder) | 6.0 |
| Salt | 1.9 |

To reconstitute a soup, the vegetables of the garnish (50 g) are poured into 1 liter of water at 60° C. which is brought to boiling point, then the dehydrated mass (84 g) (flakes and powder) is poured in and the mixture is allowed to cook for about 5 seconds under a gentle heat.

Pulpy soup containing leeks and potatoes (Example 18)

| | Composition (%) |
|---|---|
| Garnishing of compressed leeks | 34.8 |
| Dehydrated mass | |
| Vegetables on support (flakes) | 49.0 |
| Skimmed milk | 7.0 |
| Fats (powder) | 6.9 |
| Salt | 2.3 |

The soup is reconstituted as indicated above, the garnishing representing 40 g and the dehydrated mass 75 g for 1 liter of water.

Cream of compressed asparagus tips

| | Composition (%) |
|---|---|
| Garnishing of compressed asparagus tips | 9.09 |
| Dehydrated mass | |
| Instant binder (flakes) | 51.81 |
| Vegetables on support (flakes) | 23.07 |
| Salt | 6.87 |
| Fats | 5.68 |
| Egg yolks (powder) | 2.27 |
| Yeast extract | 1.14 |
| Spices | 0.07 |

The soup is reconstituted as indicated in Example 17, the garnishing representing 10 g and the dehydrated mass 100 g for one liter of water.

Chicken and vegetable consommé (Example 20)

| | Composition (%) |
|---|---|
| Garnishing of compressed vegetables | 65.79 |
| Dehydrated mass | |
| Vegetables on support (flakes) | 8.06 |
| Maltodextrin | 7.01 |
| Fats | 5.26 |
| Salt | 4.23 |
| Vegetable protein hydrolysate (expanded granulates) | 3.51 |
| Yeast extract | 3.51 |
| Chicken meat | 1.75 |
| Glutamate | 0.88 |

The soup is reconstituted as indicated in Example 17, the garnishing representing 50 and the dehydrated mass 26 g for one liter of water.

We claim:

1. A process for the preparation of intermediate moisture vegetables comprising treating pieces of vegetables by a treatment selected from the group consisting of microwave blanching and microwave cooking the pieces such that the vegetables retain at least 85% of their intracellular soluble substances, partially drying the treated vegetables to a moisture content of from 45% to 55% by weight and dry mixing the partially dried vegetables with salt to infuse salt into the vegetables such that the moisture content of the pieces is from 40% to 50% by weight.

2. A process according to claim 1 wherein the treatment of the vegetables is under atmospheric pressure.

3. A process according to claim 2 wherein the vegetables are selected from the group consisting of root, tuber and bulb vegetables and combinations thereof.

4. A process according to claim 1 wherein the treatment of the vegetables is under reduced pressure.

5. A process according to claim 4 wherein the vegetables are leaf vegetables.

6. A process according to claim 1 further comprising dry mixing glutamate with the salt and partially dried vegetables.

7. A process according to claim 1 wherein salt constitutes about 12% by weight of the salt-infused vegetables.

8. A process according to claim 1 further comprising rendering the salt-infused vegetables resistant to growth of mold and yeast.

9. A process according to claim 8 wherein the salt-infused vegetables are rendered resistant by adding about 1% by weight an anti-mycotic agent.

10. A process according to claim 4 wherein the anti-mycotic agent is selected from the group consisting of sorbic acid and potassium sorbate and combinations thereof.

11. A process according to claim 1 further comprising compacting the salt-infused vegetables under a pressure of from 3 to 5 kg/cm$^2$.

12. A process according to claim 8 further comprising compacting the salt-infused vegetables after rendering them resistant to growth of mold and yeast.

13. A process for the preparation of intermediate moisture leaf vegetables having stable microbiological and organoleptic properties comprising treating pieces of leaf vegetables under reduced pressure of from 550 mm to 650 mm of mercury by a treatment selected from the group consisting of microwave blanching and microwave cooking the pieces at a temperature of from 91° C. to 96° C., drying the vegetables to a moisture content of from 45% to 55% by weight, dry mixing the partially dried vegetables with salt to infuse salt into the vegetables such that the moisture content of the vegetables is from 40% to 50% by weight.

14. A process according to claim 13 further comprising dry mixing glutamate with the salt and partially dried vegetables.

15. A process according to claim 13 further comprising rendering the salt-infused vegetables resistant to growth of mold and yeast.

16. A process according to claim 13 wherein salt constitutes about 12% of the salt-infused vegetables.

* * * * *

UNITED STATES PATENT AND TRADEMARK OFFICE
CERTIFICATE OF CORRECTION

PATENT NO. : 4,946,693

DATED : August 7, 1990

INVENTOR(S) : Pierre RISLER, et al.

It is certified that error appears in the above-identified patent and that said Letters Patent is hereby corrected as shown below:

Column 8, line 34, (line 1 of claim 10) "4" should read --9--.

Signed and Sealed this

Twenty-fourth Day of September, 1991

Attest:

HARRY F. MANBECK, JR.

Attesting Officer

Commissioner of Patents and Trademarks